7/21/87 OR 4,682,005

United States Patent [19]

Marhic

[11] Patent Number: 4,682,005

[45] Date of Patent: Jul. 21, 1987

[54] PLASMA WELDING OR CUTTING TORCH PROVIDED WITH A NOZZLE CARTRIDGE

[75] Inventor: Gérard Marhic, Cergy, France

[73] Assignee: Lair Liquide, Societe Anonyme pour l'Etude et l'Exploitation des Procedes Georges Claude, Paris, France

[21] Appl. No.: 830,113

[22] Filed: Feb. 18, 1986

[30] Foreign Application Priority Data

Feb. 22, 1985 [FR] France ............................... 85 02553

[51] Int. Cl.[4] ............................................ B23K 15/00

[52] U.S. Cl. ...................... 219/121 PM; 219/121 PP; 219/121 PR; 219/75

[58] Field of Search .................. 219/121 PM, 121 PP, 219/121 PQ, 121 PN, 74, 75, 121 PR, 76.16, 121 P; 313/231.21-231.51

[56] References Cited

U.S. PATENT DOCUMENTS

| | | | |
|---|---|---|---|
| 3,242,305 | 3/1966 | Kane et al. | 219/121 PP |
| 3,832,513 | 8/1974 | Klasson | 219/121 PP |
| 4,295,030 | 10/1981 | Hosoda et al. | 219/121 PP |
| 4,481,636 | 11/1984 | Curr et al. | 219/121 PM |
| 4,580,032 | 4/1986 | Carkhuff | 219/121 PQ |
| 4,590,354 | 5/1986 | Marhic et al. | 219/121 PP |

*Primary Examiner*—M. H. Paschall
*Attorney, Agent, or Firm*—Young & Thompson

[57] ABSTRACT

The plasma welding or cutting torch comprises a hollow torch body (1) whose interior is connected to a source of plasma-producing gas, an electrode (2) disposed inside the body (1) and electrically connected to an electrical supply conductor, and a nozzle (3) provided with a plasma outlet orifice (34). This torch is characterized in that it comprises a cartridge (60) which cannot be disassembled and comprises an annular skirt (4) assembled by screwing with the torch body (1) and having a seat **(18*b*) for the nozzle (3) which is freely slidably mounted in the skirt (4) and applied against the seat (18*b*)** solely by the pressure of the plasma-producing gas.

9 Claims, 2 Drawing Figures

PLASMA WELDING OR CUTTING TORCH PROVIDED WITH A NOZZLE CARTRIDGE

The present invention relates to a plasma welding or cutting torch comprising a torch body whose interior is connected to a source of plasma-producing gas, an electrode disposed inside the body and electrically connected to an electrical supply conductor, and a plasma outlet nozzle mounted in facing relation to and at a distance from the electrode and provided with an orifice for the outlet of the plasma.

A plasma torch is known from U.S. Pat. No. 3,242,205 in which the electrode and the nozzle are cooled by a stream of liquid such as water. In this torch, the electrode is movable relative to the nozzle and in electrical contact with the latter when the torch is at rest. When the torch is supplied with current, the cooling liquid is put under pressure and, by means of a hydraulic mechanism, compresses the spring and separates the electrode and the nozzle, thereby creating an electric arc which establishes the electric arc in the plasma-producing gas. Such a system having a hydraulic circuit is particularly difficult to produce and consequently expensive.

It is known from French Pat. No. 2,385,483 to establish the arc between the electrode and the nozzle by shortcircuiting these two elements, the electrode being screwed and put in contact with the nozzle and then unscrewed, the gap between the electrode and the nozzle being then adjusted to the desired value. Such a screwing and unscrewing system is particularly impractical to use and requires an adjustment of the jet of the torch each time the latter is started up.

More recently, there was proposed in U.S. Pat. No. 4,567,346 Gerard Marhic incorporated therein as a reference, a process for starting up a plasma torch by a short circuit between the electrode and the nozzle. In this process, the nozzle is freely slidably mounted in the torch body so as to come into contact with the electrode when the torch is applied against a workpiece to be welded or cut. By withdrawing the torch, an arc is ignited between the electrode and the nozzle which permits initiating the plasma-producing gas and maintaining an electric arc which is transferred to the workpiece to be cut.

U.S. Ser. No. 716,191 now U.S. Pat. No. 4,590,354 Marhic et al entitled "Plasma welding or cutting torch", incorporated therein as a reference discloses a plasma welding or cutting torch comprising a structure particularly well adapted to carrying out the process disclosed in the aforementioned application in the name of the applicant. This torch mainly comprises a torch body whose interior is connected to a source of plasma-producing gas, an electrode disposed inside this body and electically connected to an electrical supply conductor, and a plasma outlet nozzle mounted in facing relation to and at a distance from the electrode and provided with an orifice for the outlet of the plasma. It further comprises an annular detachable skirt connected to the torch body and having at least one seat for the nozzle which is freely slidably mounted in the skirt and applied against its seat solely under the effect of an elastic force. In a preferred embodiment, the elastic force which applies the nozzle against its seat is the pressure of the plasma-producing gas.

The plasma welding or cutting torch disclosed in the two aforementioned patent applications gives full satisfaction. However, it has been found that the torch disclosed in the above application could be further improved in some respect.

It has indeed been found that this torch with its electrode, torch and skirt structure which is capable of being disassembled could sometimes result in assembling errors. Thus it has been found that it was possible to mount the skirt and the electrode and to forget to mount at the same time the nozzle.

Further, as the nozzle must be inserted through the inner orifice of the skirt whose outside diameter corresponds to the inside diameter of the torch body, this resulted in a nozzle of small size and consequently in an electrode of small diameter, since the electrode must partly enter the interior of the nozzle. Under these conditions, it has been found that, in some applications, it was difficult to achieve an effective cooling of the parts such as the electrode and the nozzle which have such small dimensions.

The torch according to the invention overcomes this problem. The object of the invention is to provide a cartridge which cannot be disassembled and is constituted by at least the skirt and the nozzle and is adaptable to the body of the torch.

According to the invention, the torch comprises an annular skirt connected to the torch body and comprising, on one hand, at least one seat and, on the other hand, a rear abutment for the nozzle which is freely slidably mounted in the skirt betweent the seat and the rear abutment and applied against its seat solely under the effect of an elastic force.

Preferably, the skirt of electrically insulating material is connected, in its part adjacent to the torch body, to a first conductive sleeve screwed in a conductive element of the torch body, and having a lower part adjacent to the nozzle which constitutes the rear abutment for the latter.

According to a preferred embodiment, the torch is so arranged that the first conductive sleeve has on its inner side a shoulder constituting the seat for positioning the electrode.

According to another embodiment, the skirt in its part adjacent to the nozzle will be connected to a second metal sleeve which is disposed inside the skirt and in which the nozzle is slidably mounted, the upper part of the second sleeve constituting the seat for the nozzle.

In a first modification, the electrode is capable of being disassembled. This permits supervising the evolution of the wear of the electrode and thus independently replacing the electrode and the cartridge containing the nozzle.

In a second modification, the electrode is connected to the skirt and the assembly comprising the skirt, the nozzle and the electrode thus constitutes a cartridge which cannot be disassembled.

In both cases, the cartridge according to the invention avoids assembling errors (it is no longer possible to forget the nozzle which is always mounted on the skirt) and, moreover, for a given diameter of the screw thread of the torch body, the electrode and the nozzle have sizes which are substantially larger than in the case disclosed in French patent application No. 84 05286 in which the electrode and the nozzle can be disassembled.

A better understanding of the invention will be had from the following description of embodiments which are given merely by way of non-limiting examples with reference to the accompanying drawing, in which:

BRIEF DESCRIPTION OF DRAWINGS

FIG. 1 is an axial sectional view of a torch according to the invention. It mainly comprises a torch body 1 and a cartridge 60. The torch body 1 has a bell-shaped central portion 5 and a tubular lateral extension 6 terminating in a connector 7, the central portion 5 and the tubular lateral extension 6 being of an electrically insulating material. Fitted with a force fit on the connector 7 which has outer teeth is an electrically insulating flexible pipe or hose 8 supplying a plasma-producing gas, this pipe 8 being held on the connector 7 by a coaxial outer sleeve 9. Extending through the tubular lateral extension 6 of the torch body 1 is a conduit in which is disposed a tube 11 of an electrically conductive material. At its outer end, this tube communicates with the insulating pipe 8 and is longitudinally extended inside the pipe 8 by a part of its periphery constituting a tab 12 which is transversely bent onto itself and holds by a forming over the end of an electrical supply conductor 13 disposed in the pipe 8.

Figure 1:
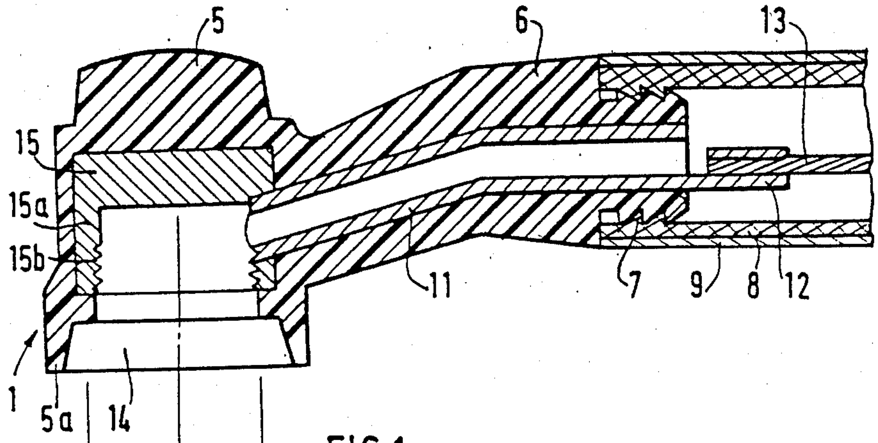
FIG. 1 is an axial sectional view of the various component elements of the torch according to the invention, the body and the cartridge being disassembled.
Figure 1:
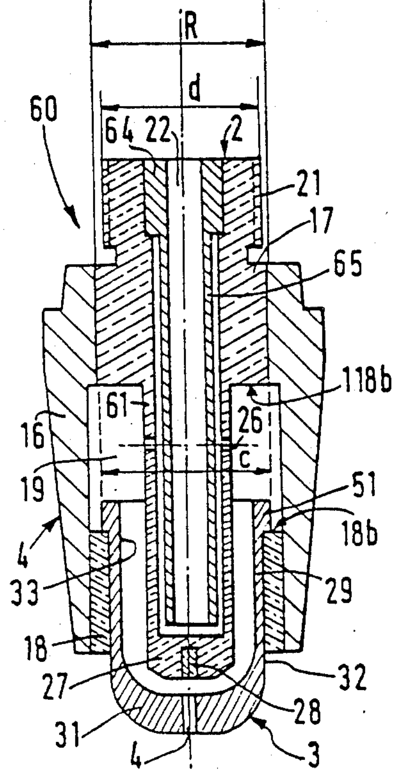

The bell-shaped portion 5 of the torch body 1 has a central cavity 14 closed in its upper part and opening downwardly. Disposed in this cavity 14 is a metal cap 15 having a cylindrical lateral wall 15a in which is provided an opening in which the inner end of a conductive tube 11 is engaged, this tube extending through the lateral extension 6. This conductive tube 11 is advantageously fixed to the metal cap by welding. Further, the cylindrical lateral wall 15*a* of the metal cap 15 has a tapped hole 15*b* on its lower end part extending below the opening in which the end of the conductive tube 11 is fixed. This lateral wall 15*a* provided with the tapped hole 15*b* stops at a distance from the lower end 5*e* of the bell-shaped portion 5.

The detachable cartridge 60 mainly comprises three elements, namely the electrode 2, the nozzle 3 and the skirt 4. The latter includes an annular case 16 of insulating material, for example a downwardly tapering frustoconical case. The case 16 is moulded onto a lower metal nozzle-carrying sleeve 18 and onto an upper electrode-carrying metal sleeve 17, the latter forming a single piece with the electrode 2. This cylindrical sleeve 18 performs the function of a seat against which the nozzle 3 comes to bear at 18*b*. For this purpose, this substantially cylindrical nozzle having an outside diameter equal to the inside diameter of the sleeve 18 apart from clearance, has an annular flange 51 in its upper part which bears against the seat 18*b*. The nozzle 3 terminates in a substantially spherical dome 31 and is thicker in its centre than in its peripheral part. The nozzle 3 is defined by a cylindrical inner lateral surface 33 which is connected to the substantially spherical inner surface of the dome 31. The latter is provided with a throughway axial orifice 34 for the passage of the plasma-producing gas.

The electrode 2 mounted on the upper sleeve 17 has on its upper end part a screw thread 21 adapted to be screwed in the tapped hole 15*b* of the cap 15 of the torch body 1. The upper sleeve 17 having a diameter e is extended by the electrode body proper 61 which has a substantially cylindrical shape but a diameter distinctly less than the diameter e. The metal electrode 2 has a blind axial bore 22 which is upwardly open, i.e. opens toward the interior of the torch body 1. Disposed substantially midway up the height is at least one opening 26 allowing the passage of the plasma producing gas from the interior of the electrode through the blin bore 22 to the nozzle 3. Preferably, the opening or openings 26 are tangentially oriented with respect to the electrode 2 so as to create a vortex of plasma-producing gas in the space 19 down to the orifice 34. Disposed axially in the central part of the lower relatively thick front wall 27 of the electrode 2 is an insert 28, for example of zirconium, which facilitates the striking of the arc. The electrode 2 also includes a cylindrical insert 64 which is mounted coaxially in the blind bore 22 and defines a passage 66 between its lower end and the bottom of the blind bore 22, and between its outer wall 65 and the wall of the blind bore 22 for the circulation of the plasma-producing gas.

Note that the diameter e of the sleeve 17 and of the inner bore of the case 16 in the region of the sleeve 17 is, apart from clearance, larger than or equal to the outside diameter c of the annular flange 51 of the nozzle 3.

When mounting the cartridge 60, the sleeve 18 is first of all inserted in the case 16. The electrode 2 is then inserted in the case 16 by mounting the upper sleeve 17 of the electrode 2 in the upper part of the case 16.

When the plasma torch is assembled, the upper sleeve 17 and the detachable skirt 4 is screwed by its screw thread 21 in the tapped hole 15*b* of the cap 15 of the torch body 1. The distance between the two seats 118*b* and 18*b* is equal to at least the distance required for the sliding of the nozzle 3 in the lower sleeve 18 for coming into contact with the electrode 2 and striking an arc between the electrode 2 and the nozzle 3. The plasma-producing gas supplied through the insulating pipe 8 enters the interior of the torch and flows in the tube 11 extending through the lateral extension 6 of the torch body 1. It then travels through the interior of the cap 15 and thereafter flows longitudinally downwardly in the bore 22 of the electrode 2 in the insert 64. In thus passing through, it cools the lower front wall 27 of the electrode 2. Then it rises between the outer wall of the insert 64 and the inner wall of the bore 22 of the electrode 2 and emerges from the latter in the tangential direction through the openings 26 and passes, on one hand, into the space defined by the end of the electrode 2 and the nozzle 3 and then through the axial orifice 34 and, on the other hand, in the lateral passages 52 and 53 (FIG. 2) between the lower sleeve 18 and the case 16 of the skirt 4. The two gas streams thus created have a substantially different rate of flow. The first stream between the electrode and the nozzle represents 10 to 20% of the rate of flow of the supply and issues from this nozzle axially through the orifice 34 so as to form the plasma. The second stream corresponds to the excess gas (80 to 90% of flow of the supply) and flows through the various passages such as 52 and 53 (FIG. 2) and issues from the torch in the form of a plurality of jets surrounding the central jet forming the plasma. In some applications, the relative proportions of the first and second stream may be substantially different. Preferably, these proportions will vary from 1/1 to 1/10.

The electrical current is supplied to the electrode 2 by the electrical connection provided between the upper conductive sleeve 17 and the metal cap 15 to which the tube 11 is welded.

In operation, when the gas under pressure is supplied to the torch according to the invention, the nozzle 3 is urged against its seat 18*b* solely under the effect of the pressure of the gas.

Figure 2:
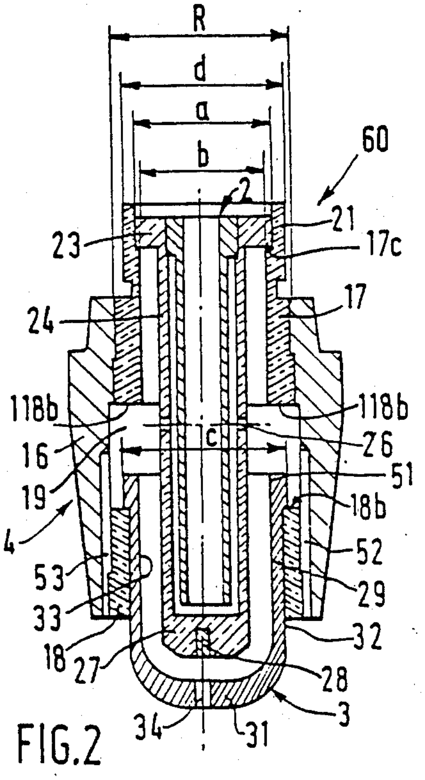
FIG. 2 is a preferred modification of the embodiment of the cartridge shown in FIG. 1.

FIG. 2 shows a preferred embodiment of the cartridge of FIG. 1 in which the same elements as those of FIG. 1 carry the same reference numerals. In FIG. 2, the electrode 2 is detachable: the nozzle 3, the case 16 of the skirt 4 and the sleeve 18 are interconnected. In order to prevent the disassembly of this cartridge and thus avoid loss of the nozzle 3, the case 16 has an internal bore larger than the diameter e and larger than or equal to the diameter c of the nozzle 3. After insertion of the latter, there is disposed inside the case 16 the upper sleeve 17 which has an internal bore 24 whose diameter b is less than the diameter c. In this way, and in the absence of the electrode 2, the displacement of the nozzle 3 is limited by the shoulder 118*b* located in the lower part of the sleeve 17. The distance between the lower sleeve 18 and the upper sleeve 17 is such that, when the cartridge is turned over, the shoulder 51 abuts against the shoulder 118*b*. This prevents the nozzle 3 from completely moving out of its sliding and guiding sleeve 18.

The upper sleeve 17 has in its upper part a bore defining a cylindrical bearing surface 17*c* acting as an abutment for the cylindrical shoulder 23 of the electrode 2. When the latter is in position, its lower part has substantially the same position as the part corresponding to the electrode of the cartridge shown in FIG. 1.

In this second embodiment, the electrode can be disassembled so that it is possible to check the state of the electrode and, as the case may be, to change the latter without changing the nozzle, or vice versa.

It will be understood that the lateral passages 52,53 may have different shapes and orientations. In particular, they may be radially oriented.

What is claimed is:

1. A plasma welding and cutting torch comprising a torch body having an interior, a source of plasma-producing gas connected to said interior, an annular skirt connected to the torch body and comprising at least a seat and a rear abutment, an electrode disposed in the skirt, an electrical supply conductor connected to the electrode, a plasma outlet nozzle freely slidably mounted in the skirt in facing relatio to and at a variable distance from the electrode and provided with a plasma outlet orifice, the nozzle being movable between said seat and said rear abutment and applicable against said seat solely under the effect of an elastic force.

2. A plasma welding and cutting torch according to claim 1, comprising a conductive element mounted in the torch body, a first conductive sleeve screw-threadedly engaged in the conductive element, the skirt being of electrically insulating material and connected, in a part of the skirt adjacent to the torch body, to a first conductive sleeve which constitutes, in a part of the conductive sleeve adjacent to the nozzle, said rear abutment for the nozzle.

3. A plasma welding and cutting torch according to claim 1, comprising a second metal sleeve disposed inside the skirt, the skirt being connected, in a part of the skirt adjacent to the nozzle, to the second metal sleeve, the nozzle being slidably mounted in the second metal sleeve, and an upper part of the second metal sleeve constituting said seat for the nozzle.

4. A plasma welding and cutting torch according to claim 2, comprising a second metal sleeve disposed inside the skirt, the skirt being connected, in a part of the skirt adjacent to thenozzle, to the second metal sleeve, the nozzle being slidably mounted in the second metal sleeve, and an upper part of the second metal sleeve constituting said seat for the nozzle.

5. A plasma welding and cutting torch according to claim 2, wherein the first conductive sleeve has on an inner side thereof a shoulder constituting said seat for the electrode.

6. A plasma welding and cutting torch according to claim 3, wherein the first conductive sleeve has on an inner side thereof a shoulder constituting said seat for the electrode.

7. A plasma welding and cutting torch according to claim 4, wherein the first conductive sleeve has on an inner side thereof a shoulder constituting said seat for the electrode.

8. A plasma welding and cutting torch according to claim 1, wherein the skirt and the nozzle are assembled in the form of a cartridge which cannot be disassembled.

9. A plasma welding and cutting torch according to claim 8, wherein the skirt, the nozzle and the electrode are assembled in the form of a cartridge which cannot be disassembled.

* * * * *